(12) United States Patent
Yeap et al.

(10) Patent No.: US 6,959,056 B2
(45) Date of Patent: Oct. 25, 2005

(54) RFI CANCELLER USING NARROWBAND AND WIDEBAND NOISE ESTIMATORS

(75) Inventors: Tet Hin Yeap, Ottawa (CA); David Kenneth Fenton, Ottawa (CA)

(73) Assignee: Bell Canada, Montreal (CA)

(*) Notice: Subject to any disclaimer, the term of this patent is extended or adjusted under 35 U.S.C. 154(b) by 1046 days.

(21) Appl. No.: 09/873,445

(22) Filed: Jun. 5, 2001

(65) Prior Publication Data

US 2001/0050987 A1    Dec. 13, 2001

Related U.S. Application Data

(60) Provisional application No. 60/210,519, filed on Jun. 9, 2000.

(51) Int. Cl.[7] .................. H03D 1/04; H04M 1/00
(52) U.S. Cl. .................. 375/346; 379/399.01
(58) Field of Search .................. 375/285, 222, 375/346, 219, 316, 257; 379/399.01, 406

(56) References Cited

U.S. PATENT DOCUMENTS

| | | | |
|---|---|---|---|
| 6,052,420 A | | 4/2000 | Yeap et al. |
| 2002/0057751 A1 | * | 5/2002 | Jagger et al. ............. 375/346 |
| 2004/0042569 A1 | * | 3/2004 | Casabona et al. ......... 375/346 |

FOREIGN PATENT DOCUMENTS

| | | |
|---|---|---|
| CA | 2237460 | 11/1998 |
| CA | 2273658 | 12/2000 |
| WO | WO 99/63675 | 12/1999 |
| WO | WO 01/59942 A1 * | 8/2001 |

OTHER PUBLICATIONS

John Cioffi & John Bingham, T1E1.4/96-084: Analog RF Cancelation with SDMT (96-084); Apr. 18, 1996.
Bernard Widrow, et al, Adaptive Noise Cancelling: Principles and Applications, Proceedings of the IEEE, vol. 63, No. 12, Dec. 1975, pp. 1692-1716.

* cited by examiner

Primary Examiner—Tesfaldet Bocure
(74) Attorney, Agent, or Firm—Thomas Adams

(57) ABSTRACT

In an adaptive filter for cancelling common-mode noise in digital subscriber loops, a narrowband noise estimator is used to detect one or more noisy frequency bands of the common mode signal and derive therefrom a first noise estimation signal. A wideband noise estimator derives from the remainder of the common mode signal a second noise estimation signal. The first and second noise estimation signals are subtracted from the differential signal, The wideband noise estimator comprises a bandstop filter for removing the frequencies detected by the narrowband noise estimator, an analog-to-digital converter for digitizing the bandstopped signal, and an adaptive filter for deriving the second noise estimation signal from the digitized bandstopped signal and, in the process, compensating for phase and gain differences, especially attributable to the interference being injected at different points along the length of the channel.

18 Claims, 4 Drawing Sheets

RFI CANCELLER USING NARROWBAND AND WIDEBAND NOISE ESTIMATORS

This application claims priority from U.S. provisional patent application No. 60/210,519 filed Jun. 9, 2000.

DESCRIPTION

1. Technical Field

This invention relates to noise cancellation and is especially applicable to a method and apparatus for cancelling common mode noise occurring in a communications channel, for example a telephone subscriber loop employing a twisted-wire pair, connected to a receiver.

2. Background Art

In theory, twisting together the conductors forming a twisted-wire cable, as used in a telephone subscriber loop, ensures that the impedance is balanced throughout its length. In practice, however, there are imbalances. For example, moisture ingress might cause one conductor to have greater leakage to ground, the twisting might not be uniform, and the conductors might be untwisted where taps are made. When a signal propagates along the cable, the waves on the respective conductors encounter different complex impedances. As a result, they may propagate at different speeds and be subject to different distortion. Upon arrival at the receiver, the two waves are no longer symmetrical. Although this effect can usually be ignored in conventional telephone systems, it presents problems in high speed digital subscriber loops, especially Very High speed Digital Subscriber Loops (VDSL) which operate at radio frequencies. Radio-frequency (RF) signals from commercial AM or amateur radio transmitters frequently couple to twisted wire cables, particularly to overhead service drops, as a common mode noise signal. Because of the above-described cable imbalance, some portion of such an RF interference signal will usually convert to differential mode and be coupled inductively across the hybrid device. In addition, the stray capacitance between the input and output of the hybrid will couple the RF interference signal to appear at the output of the hybrid device. This may be significant if the RF interference signal is relatively large in amplitude.

Various systems have been proposed to cancel common mode noise in subscriber loops. In T1E1.4/96-084 dated Apr. 18, 1996, and at a VDSL workshop at IEEE Globecom, Nov. 18, 1996 in London, England, John Cioffi and John Bingham proposed doing so by extracting a signal representing common mode noise and filtering it using an adaptive analog wide band filter to provide a radio frequency noise estimate for subtraction from the differential signal obtained from the secondary of the hybrid transformer. The coefficients of the adaptive filter were tuned during quiet periods, i.e. when no signal is being transmitted, to reduce the difference between the differential signal and the noise estimate signal substantially to zero. Unfortunately, in normal operation, the adaptive analog filter cannot readily compensate for the cross-coupling of the differential signal and common mode signals due to the loop imbalance and so, during signal transmission, will cancel part of the differential information signal too. Accordingly, the resulting signal supplied to the receiver will be distorted.

Canadian patent application No. 2,237,460 filed May 13, 1998, naming one of the present inventors, disclosed a noise suppression circuit in which a narrowband noise detection and control unit scanned the operating band to identify noisy frequency bands and suppressed the noise in those bands. The circuit is not entirely satisfactory because it requires the number of interfering RF signals to be few and does not cancel impulse noise. International patent application No. WO 99/63675 published Dec. 9, 1999, also naming such inventor, disclosed a wideband common mode noise canceller in which a digital common mode signal was filtered by an analysis filter bank to produce subband signals at different frequencies. Previous samples of each of the subband signals were summed and compared with a predetermined noise threshold. If the summed noise signal was greater than the threshold, the subband signal was processed by a synthesis filter to form a component of a noise estimate signal for subtraction from the differential signal. While this circuit will compensate to some extent for stray capacitance of the hybrid device and the above-described loop imbalance caused by inductive coupling close to the receiver, its performance is limited since RF interference often is coupled into the loop as positions far from the receiver.

As mentioned above, the radio frequency interference may be from AM radio stations or from amateur radio transmitters. While broadcast frequencies for most commercial AM stations are in the range from about 500 kHz. to about 1.5 MHz., some amateur radio transmitters, or other transmitters which might be relatively close to subscriber loops, may broadcast at frequencies up to about 10 MHz. Moreover, the RF interference signals may have widely differing amplitudes as received by the receiver. Present, commercially available noise cancellers are not able to operate satisfactorily over such a large range of frequencies and signal amplitudes. Moreover, if the source of the radio frequency interference is close to the receiver end of the subscriber loop, the common mode component and the differential component of the interference will be substantially in-phase when they reach the noise cancellation circuit. However, if the interference is injected into the subscriber loop at a significant distance from the receiver, the differential mode component and the common mode signal component will be out-of-phase upon arrival at the noise cancellation circuit because of the above-described different characteristics of their respective transmission paths, This can result in inadequate cancellation.

DISCLOSURE OF INVENTION

An object of embodiments of the present invention is to eliminate or at least mitigate one or more of the above-described limitations of known noise cancellers.

According to one aspect of the invention, apparatus for cancelling radio frequency noise occurring in a communications channel, comprises input means for connection to the communications channel and extracting therefrom a differential signal and a common mode signal, narrowband noise estimation means responsive to the common mode signal for producing a first noise estimate signal derived from relatively high amplitude narrowband radio frequency interference in one or more narrow frequency bands and wideband noise estimation means responsive to the common mode signal for producing a second noise estimate signal derived from relatively low amplitude wideband radio frequency interference in frequency bands other than said one or more narrow frequency bands, control means for controlling gain and/or phase of the noise estimate signals in relation to the differential signal, means for subtracting the first and second noise estimate signals from the differential signal, and means for compensating for phase differences between the common mode component in the differential signal and each of the first and second interference estimate signals before the signals are summed or added.

It should be noted that the terms "narrow" and "wide" when used for frequency bands refer to the bandwidth in relation to the centre frequency of the band.

The narrowband estimation means may provide an analog first estimation signal ($E_A$) and the wideband noise estimation means may provide a digital second noise estimation signal ($E_D$).

The narrowband noise estimation unit may comprise a plurality of bandpass filter means each for passing a respective common mode signal component in a corresponding one of a plurality of said narrow frequency bands and means for adjusting gain and phase of each of the common mode signal components in response to control signals from the control means.

Alternatively, the narrowband noise estimation unit may comprise a plurality of bandpass filter means each for passing a respective common mode signal component in a respective one of said plurality of narrow frequency bands, means for summing the common mode signal components, an analog-to-digital converter for converting the summed common mode signal components to a corresponding digital signal, adaptive filter means responsive to a control signal from the control unit for adjusting gain and/or phase of the digital signal relative to the differential signal, and a digital-to-analog converter for converting the adjusted digital signal to produce said first noise estimate signal.

In either of these alternative embodiments, the bandpass filters means may be adjustable in response to a frequency control signal from the control means so as to tune their respective frequency bands to the bands in which the noise occurs.

The compensating means may comprise an analog delay unit interposed between the input means and the first summing device for compensating for delay introduced in the narrowband noise estimation means and a digital delay interposed between the first summing device and the adder for compensating for delay introduced by the wideband noise estimation means.

According to a second aspect of the invention, there is provided a noise cancellation method corresponding to the noise cancellation circuit of the first aspect.

BRIEF DESCRIPTION OF THE DRAWINGS

Embodiments of the invention will now be described by way of example only and with reference to the accompanying drawings in which.

BEST MODES FOR CARRYING OUT THE INVENTION

Figure 1:
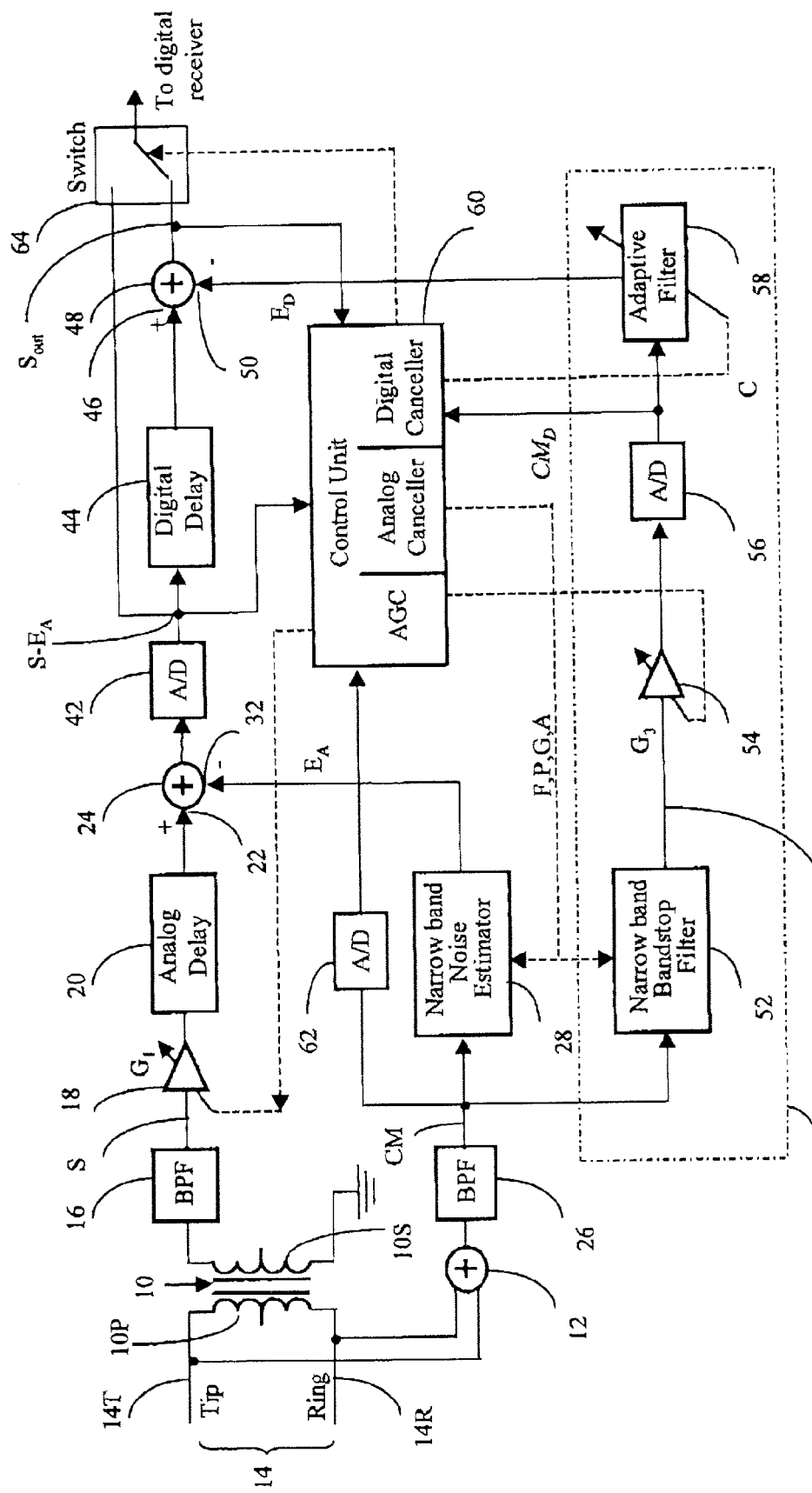
FIG. 1 is a simplified block schematic diagram of an embodiment of the invention and shows an input stage of a receiver comprising a noise cancellation circuit with first and second noise estimation units for providing first and second noise estimate signals, respectively.

In the drawings, identical or corresponding items in the different figures have the same reference numeral, with a suffix to indicate a modification, where appropriate.

FIG. 1 illustrates, schematically, a communications receiver input stage which has input means for extracting differential and common mode signals from a communications channel, first and second noise estimation means for deriving first and second noise estimate signals, respectively, from the common mode signal, and means for subtracting the first and second noise estimate signals from the differential signal to produce a noise-cancelled output signal. The input means comprises a hybrid circuit 10 for extracting the differential signal and a summing device 12 for extracting the common mode signal. The hybrid circuit 10 is shown as a hybrid transformer, but an electronic equivalent of the kind used in telecommunications systems could be used instead. The hybrid transformer 10 has its primary winding 10P connected to TIP and RING conductors 14T and 14R, respectively, of a subscriber loop 14 which constitutes the communication channel. The summing device 12 has its two inputs connected to the TIP and RING conductors 14T and 14R, respectively.

The secondary winding 10S of the hybrid transformer 10 has one end grounded and the other end connected by way of a bandpass filter 16, a variable-gain amplifier 18 and an analog delay line 20 to a first input 22 of a second summer 24. The hybrid transformer 10 converts the signal received from the subscriber loop 14 to a differential signal which includes a component corresponding to common mode radio frequency interference/noise in the signal received from the loop 14. Following filtering and amplification, this differential signal S is delayed by analog delay unit 18 before being applied to the second summer 24. The bandpass filter 16 limits the bandwidth of the differential signal from the hybrid transformer 10 to the operating frequency band of the components in the differential path and the subsequent receiver sections.

The first summer 12 supplies the common mode signal CM by way of a second bandpass filter 26 to both a narrowband noise estimation unit 28 and a wideband digital noise estimation unit 30, which derive from it first and second noise estimate signals, respectively. The first noise estimate signal $E_A$ is an analog signal and corresponds to at least one narrow frequency band at a relatively high frequency, while the second noise estimate signal $E_D$ corresponds to other and may include impulse noise. The bandpass filter 26 limits the bandwidth of the common mode signal CM to the operating frequency band of the narrowband noise estimation unit 28, the digital noise estimation unit 30, and subsequent receiver sections.

Figure 2:
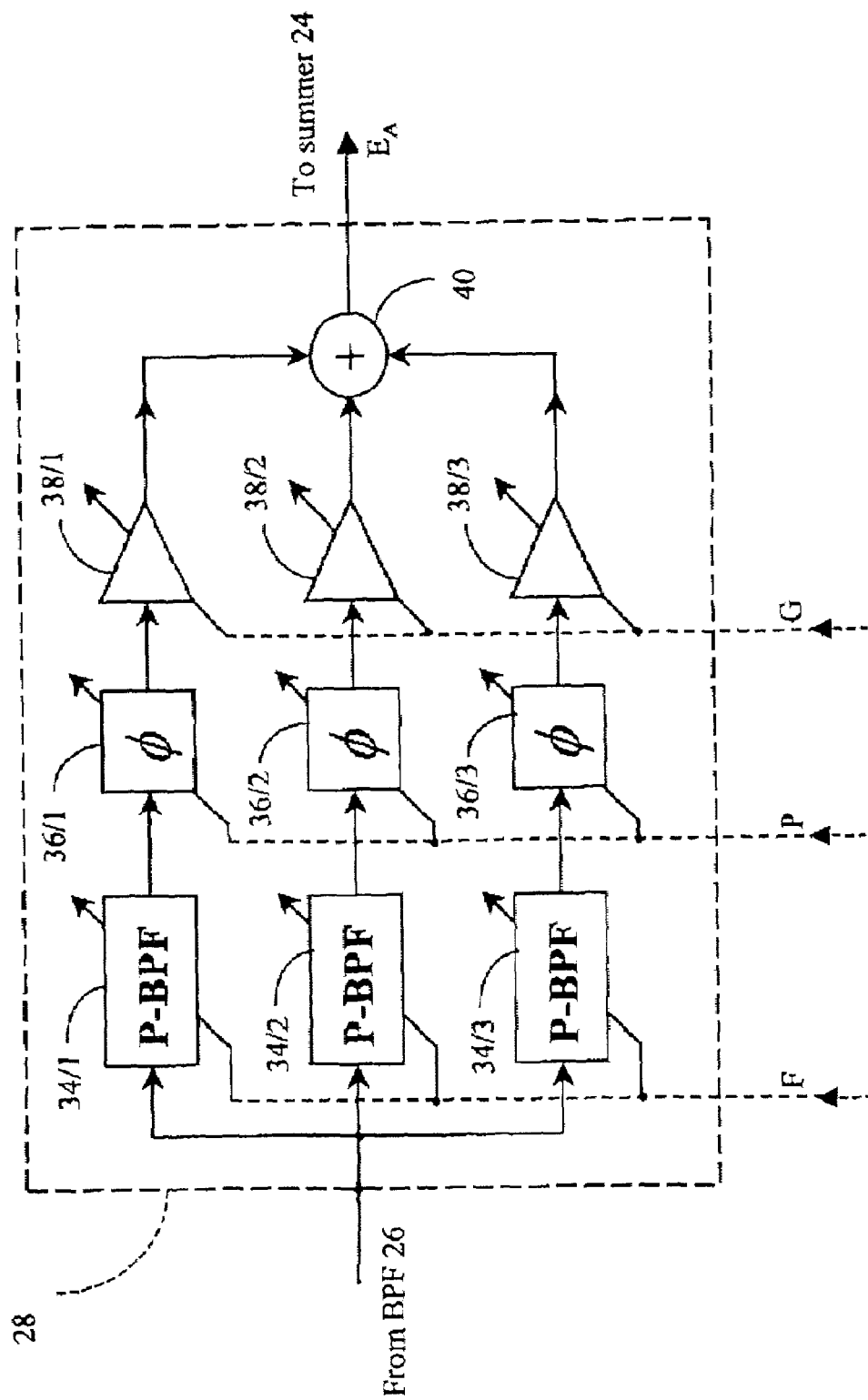
FIG. 2 is a detailed block schematic diagram of the first noise estimation unit.

The narrowband noise estimation unit 28 supplies the first noise estimate signal $E_A$ to a second (subtracting) input 32 of the second summer 24. The analog delay 20 compensates for processing delay in the noise estimation unit 28 so as to ensure the correct phase relationship between the noise estimate signal $E_A$ and the differential signal S upon their application to the summer 24. The noise estimation unit 28 may be similar to that disclosed in U.S. Pat. No. 6,052,420, which is incorporated herein by reference. As shown in FIG. 2, the noise estimation unit 28 comprises a set of three programmable bandpass filter units 34/1, 34/2 and 34/3 having passbands each of about 500 kHz. centered at, respectively, about 3 MHz., 7 MHz. and 10 MHz., i.e. North American amateur radio frequency bands. Of course, the selected passbands could correspond to other amateur radio bands, or to frequency bands of interferers that are not amateur radio transmitters. The respective outputs of the bandpass filters 34/1, 34/2 and 34/3 are connected to respective inputs of phase shifter units 36/1, 36/2 and 36/3, respectively, the outputs of which are connected to variable-gain amplifiers 38/1, 38/2 and 38/3, respectively. The outputs of the amplifiers 38/1, 38/2 and 38/3 are connected to respective inputs of a third summer 40 which sums their respective output signals to produce the analog noise estimation signal $E_A$ and supplies it to the second summer 24.

Referring again to FIG. 1, in effect, the noise estimation unit 28 will extract the common mode RF interference around 3 MHz., 7 MHz. and 10 MHz. and summing device 24 will subtract it from the differential signal S. The resulting difference signal $S-E_A$ is digitized by an A/D converter 42, conveniently a 12 bit converter, and supplied via a digital delay 44 to a first input 46 of a digital adder 48. The digital delay 44 compensates for processing delay in the digital noise estimation unit 30.

The digital noise estimation unit 30 derives the second noise estimate signal $E_D$, which represents RF interference or noise in the remainder of the operating frequency band, i.e. other than the narrow frequency bands around 3 MHz., 7 MHz. and 10 MHz., and which therefore includes the lower frequency bands usually used by AM broadcast radio stations, and impulse noise, which tends to be broadband, and supplies it to a second input 50 of adder 48, which subtracts it from the difference signal $S-E_A$ to produce the noise-cancelled differential output signal $S_{out}$ for output to the subsequent sections of the receiver.

The digital noise estimation unit 30 comprises a narrowband bandstop filter unit 52, a variable gain amplifier 54, an analog-to-digital converter 56 and a digital adaptive filter unit 58. The bandstop filter unit 52 has stop bands corresponding to the passbands of the narrowband noise estimation unit 28, namely 3 MHz., 7 MHz. and 10 MHz., conveniently provided by three bandstop filters (not shown) connected in series. The adaptive filter 58 may comprise a finite impulse response (FIR) filter having adjustable coefficients. The common mode signal CM is supplied to an input of the bandstop filter 52 which removes the frequencies in the bands around 3 MHz. and 7 MHz. and 10MHz. and supplies the residual common mode signal $CM_R$ to amplifier 54. Following amplification, the residual common mode signal is digitized by A/D converter 56, which typically comprises a 12-bit converter, and the resulting digitized signal is supplied to adaptive filter 58. The adaptive filter 58 adjusts amplitude and phase of the digitized second noise estimate signal to compensate for differences in the positions at which the interference is injected along the length of the subscriber loop 14. The output of the adaptive filter 58 is the digital noise estimate signal $E_D$ which digital adder 48 subtracts from the difference signal $S-E_A$ to produce the output signal $S_{OUT}=S-E_A-E_D$.

It should be appreciated that the adaptive filter 58 will also detect certain kinds of impulse noise in the common mode signal, particularly that injected close to the hybrid 10, and include it in the digital noise estimate signal $E_D$ so that it is cancelled along with the narrowband RF interference.

The coefficients of the adaptive filter unit 58, the gains of variable-gain amplifiers 18, 54, 38/1, 38/2 and 38/3, the phase shifts of phase shifters 36/1, 36/2 and 36/3, the pass bands of the programmable filters 34/1, 34/2 and 34/3, and the stop bands of the bandstop filter unit 52 are controlled by a control unit 60.

The control unit 60 receives the common mode signal CM from the output of the bandpass filter 26 by way of an analog-to-digital converter 62, the difference signal $S-E_A$ from the output of the A/D converter 42, the digitized bandstopped common mode signal $CM_D$ and the output signal $S_{OUT}$ from the adder 48. (The control lines between the control unit 60 and the controlled elements are shown as broken lines, whereas the lines upon which the various signals are inputted are shown in full).

The control unit 60 comprises a microcontroller programmed to monitor the correlation between different pairs of these signals and to adjust selected ones of the various adjustable elements of the circuit so as to reduce such correlation, substantially to a minimum. The output of the digital adder 48 is connected to one pole of a changeover switch 64 which has a second pole connected to the output of A/D converter 42. In addition to detecting correlation between the signals at the respective outputs of A/D converters 42 and 56, the control unit 60 detects whether there is any common mode interference at all in the differential difference signal $S-E_A$ and, if there is none, operates switch 64 to select the signal direct from the output of A/D converter 42 for output from the circuit. This avoids quantization noise caused by the digital cancellation unit 30 appearing unnecessarily in the output signal.

Hence, in the circuit of FIG. 1, the first noise estimation unit 28 removes narrowband RF interference in the 3 MHz., 7 MHz. and 10 MHz. bands and does so in an analog manner, and so can handle large amplitudes. The second noise estimation unit 30 removes RF interference from, for example, AM radio stations and impulse noise, and does so digitally, which is feasible since, on the basis of measurements, the amplitude is not particularly high.

Figure 3:
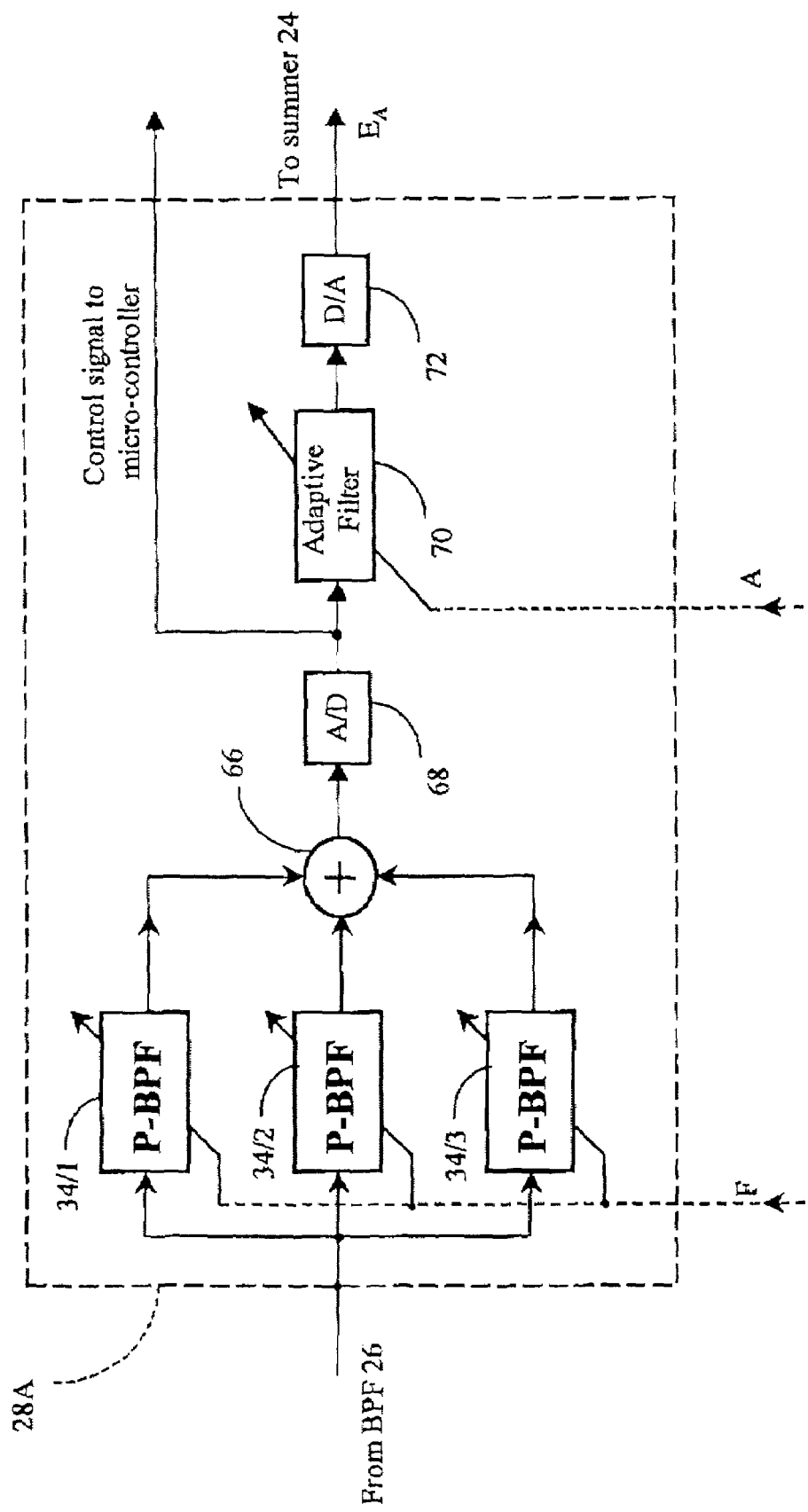
FIG. 3 is a detailed block schematic diagram of an alternative design for the first noise estimation unit.

The noise estimation unit 28 shown in FIG. 2 is rather complex. An alternative, simpler circuit 28A for producing the analog noise estimation signal $E_A$ is shown in FIG. 3 and comprises three bandpass filters 34/1, 34/2 and 34/3 in parallel, their respective inputs connected in common to the output of the bandpass filter 26 (FIG. 1) to receive the common mode signal CM. Their respective outputs are connected to a third summer 66. The filtered signals, at about 3 MHz., 7 MHz. and 10 MHz, as before, are summed by summer 66 and digitized by A/D converter 68, which supplies the digitized signal to a second adaptive filter 70. A digital-to-analog converter 72 digitizes the output signal from the adaptive filter 70 to produce the noise estimate signal $E_A$ which is supplied, as before, to the second summer 24 (FIG. 1). In this case, the control unit 60 will control the bandpass filters 34/1, 34/2 and 34/3, as before, and the coefficients of the adaptive filter 70. Even though it requires the additional A/D converter 68 and the D/A converter 72, this arrangement provides a relatively simple and less costly implementation than that shown in FIG. 2. While A/D converter 68 and D/A converter 72 will perform satisfactorily with 12 bit resolution, it is desirable for their resolution to be 14 bits or more.

Both of the above-described noise estimation units 28 and 28A are capable of adjusting both gain and phase so as to compensate for differences resulting from the interference being injected at different distances along the loop 14. However, it is envisaged that a third "noise estimation unit" having capacitive coupling characteristics similar to those of the hybrid transformer 10, or its electronic equivalent, may be added in parallel with the noise estimation unit 28 or 28A. Such a capacitive coupling unit is disclosed in Canadian patent application number 2,273,658 and corresponding U.S. patent application filed Jun. 7, 2000, which are incorporated therein by reference, Such a capacitive coupling unit is particularly effective where the interference injection point is relatively close to the proximal end of the subscriber loop 14.

Referring again to FIG. 1, during manufacture, the delay provided by the analog delay unit 20 is adjusted to compensate for delay introduced by the amplifiers 18 and 54 and the narrowband noise estimation unit 28 so that the common mode estimate signal $E_A$ is synchronized with the common mode component of the differential signal S at the summer 24. In operation, the gains in the differential signal path and common mode signal path are adjusted so that the amplitude of the common mode noise estimate signal $E_A$ will correspond to that of the common mode noise component of the differential signal at summer 24, and to ensure that the voltages applied to A/D converters 42 and 56 are optimized to provide adequate resolution and range without saturation.

Figure 4:
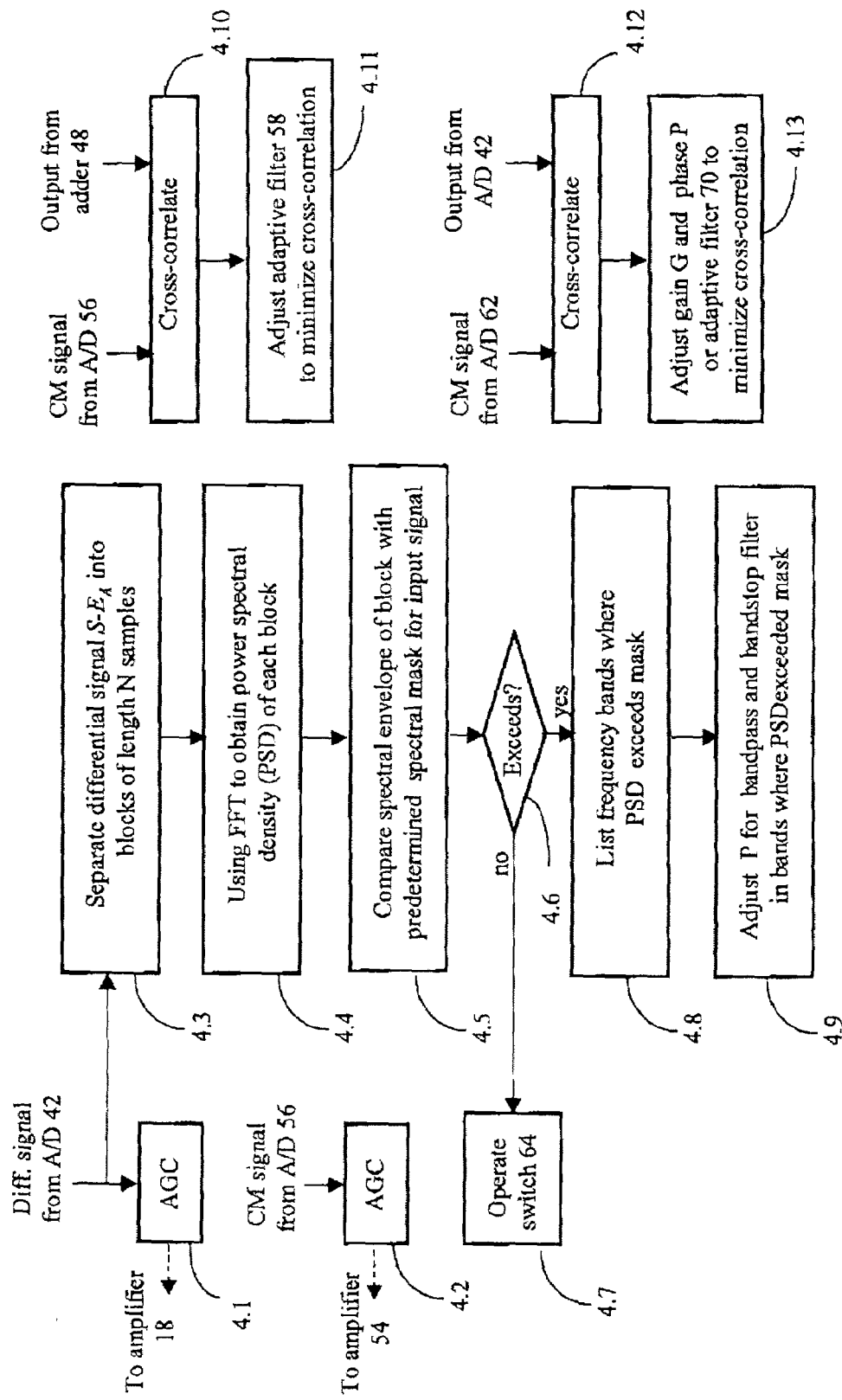
FIG. 4 illustrates functions of a control unit of the embodiment of FIG. 1.

Operation of the circuit of FIG. 1 will now be described with reference to FIG. 4, which illustrates functions performed by the control unit 60. Initially, in steps 4.1 and 4.2, the control unit 60 automatically adjusts the gain of each of the amplifiers 18 and 54 in dependence upon the signals received from A/D converters 42 and 56, respectively, to ensure sufficient resolution without saturating the A/D converters 42 and 56 and to ensure that, as mentioned above, the amplitudes of the common mode noise estimate signals $E_A$ and $E_D$ are appropriate for cancellation of the corresponding common mode noise components in the differential signal S. The control unit 60 then proceeds to determine whether or not noise cancellation is needed. In step 4.3, the control unit 60 partitions the differential difference signal $S-E_A$ from A/D converter 42 into blocks each comprising N samples, for example 240 samples, and in step 4.4 uses Fast Fourier Transform (FFT) to obtain the power spectral density envelope of each block. In step 4.5, it compares the resulting spectral envelope of each block with a spectral mask previously stored in the memory of the control unit 60's microcontroller (not shown). It is expected that the parameters of the spectral mask will be set by national or international standards on the basis of experiments conducted with various kinds of communications channels or loops. Alternatively, they could be determined by measuring the signal following installation. In decision step 4.6, the control unit 60 determines whether or not the PSD exceeds the mask anywhere by a predetermined margin. If it does not, i e. there is insufficient interference to require cancellation, in step 4.7 the control unit 60 operates switch 64 to bypass the digital noise estimation unit 30.

If step 4.6 indicates that there is sufficient interference, in step 4.8, the control unit 60 determines the frequency bands in which the power spectral density of the block exceeds the envelope of the spectral mask and stores the information. In step 4.9, the control unit 60 determines for each band (3 MHz., 7 MHz., 10 MHZ.) whether or not the power spectral density exceeded the envelope in a predetermined number X of a predetermined previous number Y of the blocks. If it did, the control unit 60 adjusts control signal F (FIG. 1) to tune the corresponding one(s) of the bandpass filters 34/1, 34/2 and 34/3 and the corresponding bandstop filter(s) of bandstop filter unit 50 to the centre frequency of the band in which the envelope was exceeded.

Once the noise estimation units 28 and 30 have been tuned to the required bands, the control unit 60 begins to cancel the interference. Thus, in step 4.10, the control unit 60 measures cross-correlation between the digital signal from A/D converter 56 i.e. the common mode signal minus the stopped bands, and the differential output signal $S_{OUT}$ at the output of adder 48 and step 4.11 adjusts the coefficients of the adaptive filter 58 to reduce any such correlation and, over a series of iterations, to substantially minimize it.

In step 4.12, the control unit 60 also measures cross-correlation between the common mode signal CM from A/D converter 62 and the output of A/D converter 42, i.e. the first difference signal $S-E_A$. If the first noise estimation unit 28 is as shown in FIG. 2, in step 4.13 the control unit 60 then adjusts the gain control signal G and the phase control signal P to adjust the amplifiers 38/1, 38/2 and 38/3 and the phase shifters 36/1, 36/2 and 36/3, again to reduce the cross-correlation and, over several iterations, to substantially minimize it. Where the narrowband noise estimation unit 28 is as shown in FIG. 3, i.e. with no amplifiers or phase shifters, the control unit 60 will adjust control signal A (FIG. 1) to control the coefficients of adaptive filter 70 so as to minimize the cross-correlation between the common mode signal CM and the difference signal $S-E_A$. Because the noise estimation unit 28A in FIG. 3 includes an A/D converter 68, the A/D converter 62 (FIG. 1) can be omitted and the signal for the control unit 60 taken from A/D converter 68. The order in which the two cross-correlation processes are performed is not important.

Where a capacitive coupling unit is included, the control unit 60 may adjust the gain of an associated amplifier to adjust the amplitude of the signal therefrom.

An advantage of using an analog narrowband noise estimation unit 28 in combination with a digital wideband noise estimation unit 30 is that the analog/digital converter 56 in the digital noise estimation unit 30 may have a relatively low resolution, i.e. 12 bits, because it does not have to handle the whole range of amplitudes of the common mode interference signal. For example, in many cases, amateur radio interference is received with a much greater amplitude than AM broadcast stations. An A/D converter capable of handling the whole range of amplitudes would require a high resolution, e.g. 16 bits or more. Such a high resolution A/D converter capable of handling the required frequencies, would not, at present, be commercially feasible.

The design of an adaptive filter 58 is known to persons skilled in this art and so will not be described further here; a good description can be found in an article by Bernard Widrow et al. entitled "Adaptive Noise Cancellation: Principles and Applications", *Proceedings of the IEEE*, Vol. 63, No. 12, December 1975, pp. 1692–1716.

The invention embraces various other modification and improvements to the above-described embodiments. Thus, control unit 60 could extract differential and common mode signals from other points in the differential signal path and common mode signal path, respectively.

It should be appreciated that the various aspects of the invention are not necessarily limited to noise cancellation in twisted pair subscriber loops but could be applied to other communications channels, in which case the input means might not be a hybrid transformer. For example, the embodiments of the invention could be used with communications channels which employ coaxial cables, comprising a coaxial shield and one or more inner conductors. In such a case, the hybrid transformer 10 would be omitted and the coaxial shield connected directly to the input of bandpass filter 16. Where a single inner conductor was used, it would be connected directly to the input of bandpass filter 16. If two or more inner conductors were used, they would be interfaced to the noise detection circuit by way of a suitable matching transformer.

It should also be appreciated that, where the noisy frequency bands are known and static, the bandpass filters 34/1, 34/2 and 34/3 need not be adjustable.

INDUSTRIAL APPLICABILITY

Embodiments of the invention advantageously provide a noise cancellation circuit for communications channels, such as telephone subscriber loops, which is capable of handling RFI over a relatively large range of frequencies, such as AM radio and amateur radio bands, and over a wide range of amplitudes and which compensates for impedance imbalance effects in the communications channel. Moreover, such noise cancellation circuits do not need quiet periods but will adapt the coefficients of adaptive filter 58 during normal operation.

What is claimed is:

1. Apparatus for cancelling radio frequency noise occurring in a communications channel, comprising input means (10, 12, 16, 26) for connection to the communications channel (14) and for extracting therefrom a differential signal (S) and a common mode signal (CM), narrowband noise estimation means (28) responsive to the common mode signal (CM) for producing a first noise estimate signal ($E_A$) derived from relatively high amplitude narrowband radio frequency interference in one or more narrow frequency bands and wideband noise estimation means (30) responsive to the common mode signal for producing a second noise estimate signal ($E_D$) derived from relatively low amplitude wideband radio frequency interference in frequency bands other than said one or more narrow frequency bands, control means (60) for controlling gain and/or phase of the noise estimate signals in relation to the differential signal (S), means (48) for subtracting the first and second noise estimate signals from the differential signal, and means for compensating for phase differences between the common mode component in the differential signal and each of the first and second interference estimate signals before the signals are summed or added.

2. Apparatus according to claim 1, wherein the compensating means comprises an analog delay unit interposed between the input means and the first summing device for compensating for delay introduced in the narrowband noise estimation means and a digital delay interposed between the first summing device and the adder for compensating for delay introduced by the wideband noise estimation means.

3. Apparatus according to claim 1, wherein the narrowband estimation means (28) provides an analog first estimation signal ($E_A$) and the wideband noise estimation means (30) provides a digital second noise estimation signal ($E_D$).

4. Apparatus according to claim 1, wherein the narrowband noise estimation unit (28) comprises a plurality of bandpass filter means (34/1, 34/2, 34/3) each for passing a respective common mode signal component in a corresponding one of a plurality of said narrow frequency bands and means (36/1, 36/2, 36/3, 38/1, 38/2, 38/3) for adjusting gain and phase of each of the common mode signal components in response to control signals (P, G) from the control means (60).

5. Apparatus according to claim 1, wherein the narrowband noise estimation unit (28) comprises a plurality of bandpass filter means (34/1, 34/2, 34/3) each for passing a respective common mode signal component in a respective one of said plurality of narrow frequency bands, means (66) for summing the common mode signal components, an analog-to-digital converter (68) for converting the summed common mode signal components to a corresponding digital signal, adaptive filter means (70) responsive to a control signal (A) from the control unit (60) for adjusting gain and/or phase of the digital signal relative to the differential signal, and a digital-to-analog converter (72) for converting the adjusted digital signal to produce said second noise estimate signal ($E_A$).

6. Apparatus according to claim 4, wherein the filter means (34/1, 34/2, 34/3) are adjustable in response to a frequency control signal (F) from the control means (60) so as to tune their respective pass bands to the frequency bands in which the noise occurs.

7. Apparatus according to claim 5, wherein the filter means (34/1, 34/2, 34/3) are adjustable in response to a frequency control signal (F) from the control means (60) so as to tune their respective pass bands to the frequency bands in which the noise occurs.

8. Apparatus according to claim 1, wherein the control unit (60) selects blocks of the digitized differential signal having a predetermined number of samples, derives a power spectral density envelope (PSD) for each block, and compares the power spectral density envelope with a predetermined spectral mask to determine said one or more narrow frequency bands.

9. Apparatus according to claim 1, further comprising switching means (64) controlled by the control unit (60) for selecting either the difference ($S-E_A$) between the differential signal and the first noise estimation signal or the difference ($S-E_A-E_D$) between the differential signal and the sum of the first and second noise estimation signals in dependence upon the presence or absence of a predetermined level of common mode interference in the differential signal.

10. A method of cancelling radio frequency noise occurring in a communications channel using a noise cancellation circuit having input means (10, 12, 16, 26) for connection to the communications channel (14), further comprising the steps extracting from the channel via the input means a differential signal (S) and a common mode signal (CM), deriving a first noise estimation signal from relatively high amplitude narrowband radio frequency interference in one or more narrow frequency bands of the common mode signal (CM), deriving from the common mode signal a second noise estimate signal ($E_D$) from relatively low amplitude wideband radio frequency interference in frequency bands of other than said one or more narrow frequency bands, controlling gain and/or phase of the noise estimation signals in relation to the differential signal (S), subtracting the first and second noise estimation signals from the differential signal, and compensating for phase differences between the common mode component in the differential signal and each of the first and second noise estimation signals.

11. A method according to claim 10, wherein the compensation is provided by delaying the differential signal by a first analog delay corresponding to delay introduced by the narrowband noise estimation step and by delaying the resulting difference signal using a digital delay for compensating for delay introduced by the wideband noise estimation step.

12. A method according to claim 10, wherein the first noise estimation signal ($E_A$) is analog and the second noise estimation signal ($E_D$) is digital.

13. A method according to claim 10, wherein the first noise estimation signal is obtained by passing the common mode signal through a plurality of bandpass filter means (34/1, 34/2, 34/3) each for passing a respective common mode signal component in a corresponding one of a plurality of said narrow frequency bands and adjusting gain and phase of each of the common mode signal components in response to control signals derived in dependence upon cross-correlation between the common mode signal and the difference signal ($S-E_A$).

14. A method according to claim 10, wherein the first noise estimation signal is obtained by passing the common mode signal through a plurality of bandpass filter means (34/1, 34/2, 34/3) each for passing a respective common mode signal component in a respective one of said plurality of narrow frequency bands, summing the common mode signal components, converting the summed common mode signal components to a corresponding digital signal, using an adaptive filter means (70) to adjust gain and/or phase of the digital signal relative to the differential signal, and converting the adjusted digital signal to produce said second noise estimation signal ($E_A$).

15. A method according to claim 13, further comprising the step of adjusting the filter means (34/1, 34/2, 34/3) so as to tune their respective pass bands to said one or more narrow frequency bands of the common mode signal.

16. A method according to claim 14, further comprising the step of adjusting the filter means (34/1, 34/2, 34/3) so as to tune their respective pass bands to said one or more narrow frequency bands of the common mode signal.

17. A method according to claim 10, wherein the one or more narrow frequency bands are determined by selecting at least one block of the digitized differential signal having a predetermined number of samples, deriving a power spectral density envelope (PSD) for the block, comparing the power spectral density envelope with a predetermined spectral mask and determining said one or more narrow frequency bands as those in which the envelope exceeds the mask.

18. A method according to claim 10, further comprising the step of selecting either the difference ($S-E_A$) between the differential signal and the first noise estimation signal or the difference ($S-E_A-E_D$) between the differential signal and the sum of the first and second noise estimation signals in dependence upon the presence or absence of a predetermined level of common mode interference in the differential signal.

* * * * *